United States Patent
Kim et al.

(10) Patent No.: US 8,498,726 B2
(45) Date of Patent: Jul. 30, 2013

(54) BI-DIRECTIONAL BROADCASTING SYSTEM FOR A SMALL SPACE

(76) Inventors: Young-Eon Kim, Cupertino, CA (US); Hyun-Jeong Kim, Cupertino, CA (US)

( * ) Notice: Subject to any disclaimer, the term of this patent is extended or adjusted under 35 U.S.C. 154(b) by 761 days.

(21) Appl. No.: 12/674,887

(22) PCT Filed: Nov. 19, 2007

(86) PCT No.: PCT/KR2007/005260
§ 371 (c)(1),
(2), (4) Date: Feb. 23, 2010

(87) PCT Pub. No.: WO2009/051287
PCT Pub. Date: Apr. 23, 2009

(65) Prior Publication Data
US 2011/0128452 A1      Jun. 2, 2011

(30) Foreign Application Priority Data
Oct. 17, 2007    (KR) .................. 10-2007-0104571

(51) Int. Cl.
*G06F 17/00* (2006.01)
*H04B 5/00* (2006.01)
*H04R 29/00* (2006.01)
*G09F 27/00* (2006.01)

(52) U.S. Cl.
USPC ................. 700/94; 381/77; 381/58; 381/124

(58) Field of Classification Search
CPC ...... H04B 1/0003; H04B 1/0007; H04B 5/006; H04N 5/9265; H04N 5/60; H04N 5/67; H04R 2420/07; H04S 7/30; H04S 7/308
USPC ..................... 381/58, 59, 79, 80, 124; 700/94
IPC .. H04B 1/0003, 1/0007, 5/0006; H04N 5/9265, H04N 5/60, 5/67; H04R 2420/07; H04S 7/30, H04S 7/308
See application file for complete search history.

(56) References Cited

U.S. PATENT DOCUMENTS

| | | | |
|---|---|---|---|
| 6,175,628 B1 * | 1/2001 | Reinold et al. .................. 380/42 |
| 6,697,687 B1 * | 2/2004 | Kasahara et al. ............... 700/94 |
| 8,321,038 B2 * | 11/2012 | Igoe et al. ....................... 700/19 |
| 2007/0124778 A1 * | 5/2007 | Bennett et al. .................. 725/81 |
| 2007/0127925 A1 * | 6/2007 | Hayashibara ................. 398/116 |
| 2008/0063211 A1 * | 3/2008 | Kusunoki ....................... 381/18 |

* cited by examiner

*Primary Examiner* — Jesse Elbin
(74) *Attorney, Agent, or Firm* — LRK Patent Law Firm

(57) ABSTRACT

The present invention relates to a bi-directional broadcasting system for a small space. More particularly, multiple users enjoy the optimum surround sound and pursue the best convenience simultaneously by wirelessly connected an external receiver, multiple headphones, and external speakers which can be installed and composed variously, while watching a video media which was received through a television transmitting and receiving antenna or external signal input devices by a host television, that was related to a bi-directional broadcasting system for a small space.

9 Claims, 10 Drawing Sheets

Fig. 6

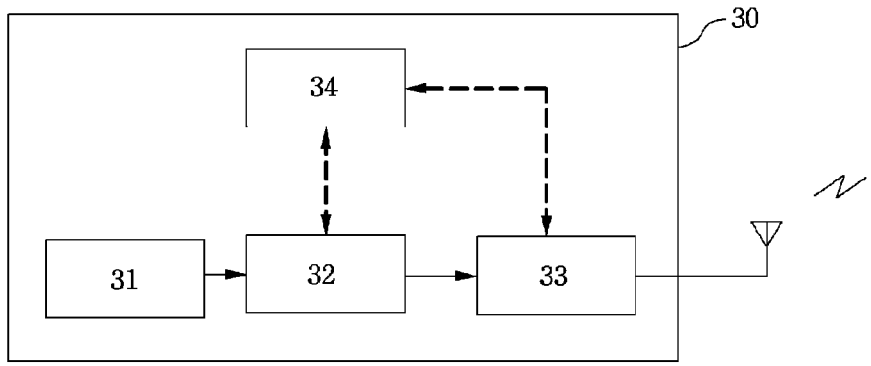

Fig. 7

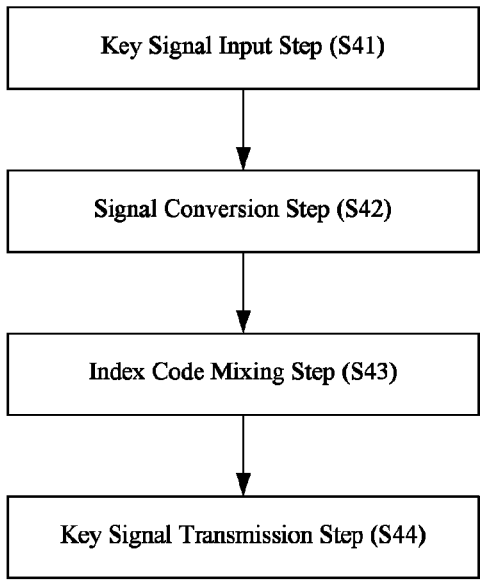

Key Signal Input Step (S41)

Signal Conversion Step (S42)

Index Code Mixing Step (S43)

Key Signal Transmission Step (S44)

Fig. 8

| Output Mode | Internal Speaker | External Speaker | External Head-phones | External Audio Receiver | Signal Output | Output Sound |
|---|---|---|---|---|---|---|
| Mode 1 | X | O | X | X | Ext. 5.1ch | Sound at External only |
| Mode 2 | O | X | X | X | Int. 2ch/ 2.1ch | Sound at Int. 2ch and 2.1ch |
| Mode 3 | O | O | X | X | Int. 5.1ch, Ext. 5.1ch | Sound at Int. 5.1ch and Ext. 5.1ch |
| Mode 4 | X | X | O | X | Ext. 2ch | Sound at Headphones 2ch |
| Mode 5 | O | X | O | X | Int. 2/ 2.1ch Ext. 2ch | Sound at Int. 2ch/ 2.1ch, and Headphones 2ch |
| Mode 6 | X | X | X | O | Ext. 5.1ch | Sound at External 5.1ch | ly connected external sound output systems can be installed and
BI-DIRECTIONAL BROADCASTING SYSTEM FOR A SMALL SPACE

TECHNICAL FIELD

The present invention relates to bi-directional broadcasting system for a small space, and more particularly, while watching media video through a host television, wirelessly connected external sound output systems can be installed and composed variously that bring the optimum sound for multiple users.

BACKGROUND ART

In general, a television is a media system which receives a media signal from outside through a cable or a satellite, displays a video signal on a screen, outputs the sound by speakers and directs users to watch video screen while they are listening the sound at the same time.

As for nowadays, a screen that displays the video is highly developed and enlarged in size such as LCD. The screen technology has continuously developed and improved as if we are watching real live. Along with this video display, sound output system has been multi-channeled so that by installing multiple external front and back speakers, the user can enjoy the surround sound system around him or her.

However, external speakers are connected to a television by wires. Since the wire is visible, it degrades indoor interior, sound quality, and brings installation issues. Also for a headset, due to enlarged screen display, the connection cable can be very long to use and even if the headset is used, it is limited for only one person and not suitable for more than one person.

Also for the television, it needs to be installed with multiple connectors as extra for outputting to external speakers, and it is limited in design and complicated in installation. Therefore, it brings limitation for customers to listen great quality of surround sound.

Moreover once installation is done through cable between the television and external speakers, if we want to exchange with new speakers or another television, we need to pull back all the old installation and cable connected to equipments again. This can cause bothersome whenever we would like to have new indoor interior.

Furthermore, for example in a conference room, an extra system is required to provide cabled headsets to all the attendants. This will cause inconvenience connections along with lots of power loss.

Even if it is wirelessly connected, the system configuration and installation is complicated because and there is possibility that only a remote controller or external speaker works. As for the headset, there is also a problem that an extra wireless sending/receiving system are required and there is possibility which creates a perplexed system design.

DISCLOSURE OF INVENTION

Technical Problem

To solve problems as mentioned above, this present invention as digital host television provides a circumstance where while people watches a media video, one broadcasting system can managed to have wirelessly connected multiple external speakers, multiple headsets and an external audio receiver to bring an optimal surround sound system. Since external speakers which provide multi surround sound are wirelessly connected, people can freely and easily move around equipments upon their taste and enjoy multi surround sound.

Also a host television and speakers are wirelessly connected, the installation and changing is convenient and customers can freely manage indoor interior changes and external speaker changes.

Furthermore the customer can hear the audio signal from a host television wirelessly. If there is need of using headsets, multiple of people can accouter simultaneously and have freedom in movement since there is no limitation on speaker connectors of the host television.

Technical Solution

To achieve the purpose as above, the present invention, Bi-directional broadcasting system for a small space (A), has a digital or analog host television (10) which outputs video and audio of media signal; an external sound output system (20) which receives audio signal from above host television (10) and outputs the sound. Above host television (10) has an input signal processing block (11) for processing input signal; an audio signal processing block (12) for detecting audio signal from media signal of input signal from the input signal processing block (11); an audio sound processing power amp (13) for amplifying the audio signal from above audio signal processing block (12); internal speakers (141) for outputting sound by connected with the audio sound processing power amp (13); a host control block (15) for controlling above input signal processing block (13), an audio signal processing block (12) and an audio sound processing power amp (13); and an host memory block (18).

As of bi-directional broadcasting system for a small space, above host television (10) includes a host transceiver (16) which receives the audio signal from the audio signal processing block (12) and transmits into a RF signal which was modulated. Above audio signal processing block (12) contains a decoding block (121) for decoding audio signal, and an audio signal selection block (122) for selectively detecting audio sound depend on the information of external equipments which stored in the host memory block (18), among decoded audio signal which is connected with above decoding block (121); a down-mixing block (123) for down-mixing detected audio signal from the audio signal selection block (122); an encoding block (124) is also contained which encodes signal by connection with the down-mixing block (123) to wirelessly transmit an audio signal. Above host transceiver (16) is composed of a code compound block (161) which compounds the recognized code to encoded audio signal in order to transform, and a signal transformer (162) which transforms the audio signal to RF signal for transmitting. Above the external sound output system (20) receives the audio signal by sending through the host transceiver (16) of the host television (10), and outputs the sound.

Above external sound output system (20) consists of; an external transmitting and receiving signal processing block (21) for receiving outputted signal from the host transceiver (16) of above host television(10), an external audio signal processing block (22) for transforming inputted audio signal of above external transmitting and receiving signal processing block (22), an external audio sound power amplifier block (23) for amplifying an outputted audio signal from above external transmitting and receiving signal processing block (22), an external speaker (24) for outputting sound by connected with above external audio sound power amplifier block (23), an external control block (25) for controlling the external transmitting and receiving signal processing block (21), the external audio signal processing block (22), and the external audio sound power amplifier block (23), and an external memory block (26). Above external control block

(25) compares received signal from the external transmitting and receiving signal processing block (21) with external equipment recognized code, host recognized code, and recognized code of received signal which are all stored in above external memory block (26). If they match, the control signal will be provided to the audio signal processing block (22), and the audio signal processing block(22) can detect selected audio signal by above external control block (25).

Also following blocks exist; a signal processing block (32) exists for processing the signal from a key input block (31), a remote transmitter (33) which transforms the signal from above signal processing block(32) and transmits, a remote controller (30) that includes a remote control block (34) which controls above signal processing block (32) and the remote transmitter (33), above remote transmitter (33) of the remote controller (30) manages to send the data signal on control of above key input block (31) with a remote recognized code signal, a host control block (15) of the host television (10) compares one remote recognized code that received by above host transceiver (16), which had sent through the remote transmitter (33) of the remote controller (30), with another remote recognized code which stored in the host memory block (18). If the received remote recognized code and the remote recognized code which stored in the host memory block (18) do match, it transforms the received data signal and processes this data signal by above signal processing block (32).

Above external sound output system (20) is processed with any of followings; multi headsets, multi speakers, and multi external audio receivers. The external sound output system (20) receives one or more channels out of followings; 2 channel, 4 channel, 5.1 channel, 6.1 channel, 7.1 channel, which are selected by an audio signal selection block (122), and processes the selected channels and outputs surround sound through an external speaker (24).

In addition, above host television (10) receives wirelessly sent signal from an external signal input system (40) through the host transceiver (16) of the host television (10). Above input signal processing block (11) transmits detected input media signal among received input signals by above host transceiver (16) to above audio signal processing block (12), above audio signal processing block (12) detects and processes the audio signal among the media signal which was transmitted.

Furthermore, the control system of bi-directional broadcasting system for a small space according to this invention is, an input signal processing step (S21) by the input signal processing block (11) of the host television (10) which receives and processes input signals that will be transmitted either wirelessly or with cable from external sources, an audio signal detecting step (S22) which detects the audio signal among media signals of transmitted input signal from the input signal processing block (11) to the audio signal processing block (12) after that processed by above the input signal processing step (S21), a sound selecting and separating step (S23) which selectively detects the audio signal that is pertained to the information of external sources that was stored in the host memory block (18), among detected audio signals by above audio signal selection block (122) of the audio signal processing block (12), when it separates and selects detected audio signal by above audio signal detecting step (S22) according to the host control block(15), a sound transform step (S24) which transforms the audio signal which was separated and detected by above sound selecting and separating step (S23) to an audio signal though the audio signal processing block (12) in order to output through external equipment, a recognized code compounding step (S25) which compounds a recognized code into the audio signal that was transformed by above sound transform step (S24), and was transmitted from the code compound block (161) of the host transceiver (16), an audio signal transmission step (S26) which modulates the compounded audio signal by above recognized code compounding step (S25) to a RF signal, and transmits this modulated RF signal by the signal transformer (162) of the host transceiver (16) through the transmitting and receiving antenna (17);

an audio signal receiving step (S31) which receives the audio signal from the external transmitting and receiving signal processing block (21) of the external sound output system (20) which was transmitted by the transmitting and receiving antenna (17) of above hosting television (10), a recognition code distinction step (S32) which distinguishes the accord between a received signal from the external transmitting and receiving signal processing block (21) and the saved recognized code;

a decoding step (S33) which decodes and transforms the received audio signal if the recognized code is accorded by above recognized code distinction step (S32);

an audio signal amplifying step (S34) which transmits the transformed audio signal by decoding step (S33) to the external audio sound processing power amp (23) to amplify;

an external sound output step (S35) which outputs the amplified audio signal by above audio signal amplifying step (S34) through external speaker (24); that is specially characteristic of this invention.

Advantageous Effects

The present invention as above detailed equips, it can listen audio sound through supplied internal speakers or wirelessly connected external speakers and watches video media by a digital host television. It takes effectual to enjoy the optimal surround sound by freely arranging the location of the wireless external speakers that was equipped to listen to surround sound.

Also since the host television and external speakers are not connected by a wire or a cable, it has advantage of having a convenient installation and modification; moreover for change in home interior or different external speaker type, the installation comes easy and convenient.

Furthermore, another advantage that the present invention has is that audio signal from the host television can be heard wirelessly so that the place where multiple headsets are required, multiple people can listen simultaneously without limitation of output ports of the host television. It has a merit to be used conveniently because it is composed of a simple system to connect wireless external speakers, multiple wireless headsets, a wireless audio receiver, and a wireless remote controller by a bi-directional broadcasting system for a small space.

BRIEF DESCRIPTION OF THE DRAWINGS

FIG. 6 is an organization chart of the remote controller of a bi-directional broadcasting system for a small space according to this invention.

FIG. 7 is a block diagram of the control block for a remote controller of a bi-directional broadcasting system for a small space according to this invention.

FIG. 8 is an explanation table of external equipment set up of a bi-directional broadcasting system for a small space according to this invention.

BEST MODE FOR CARRYING OUT THE INVENTION

Below is detailed explanation of this present invention, bi-directional broadcasting system for a small space, with attached drawings.

Figure 1:
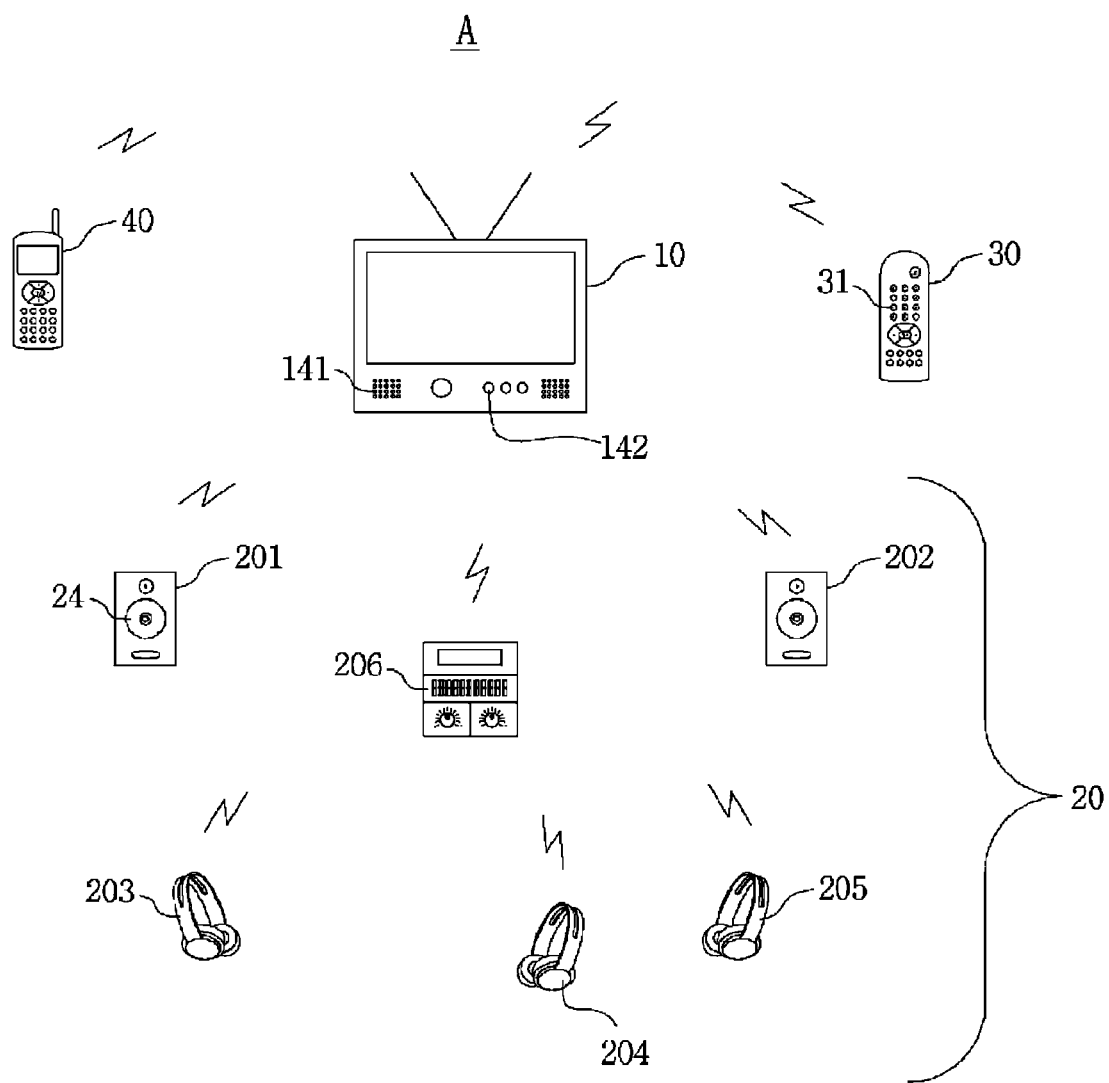
FIG. 1 is a whole organization chart of the bi-directional broadcasting system for a small space according to this invention.
Figure 2:
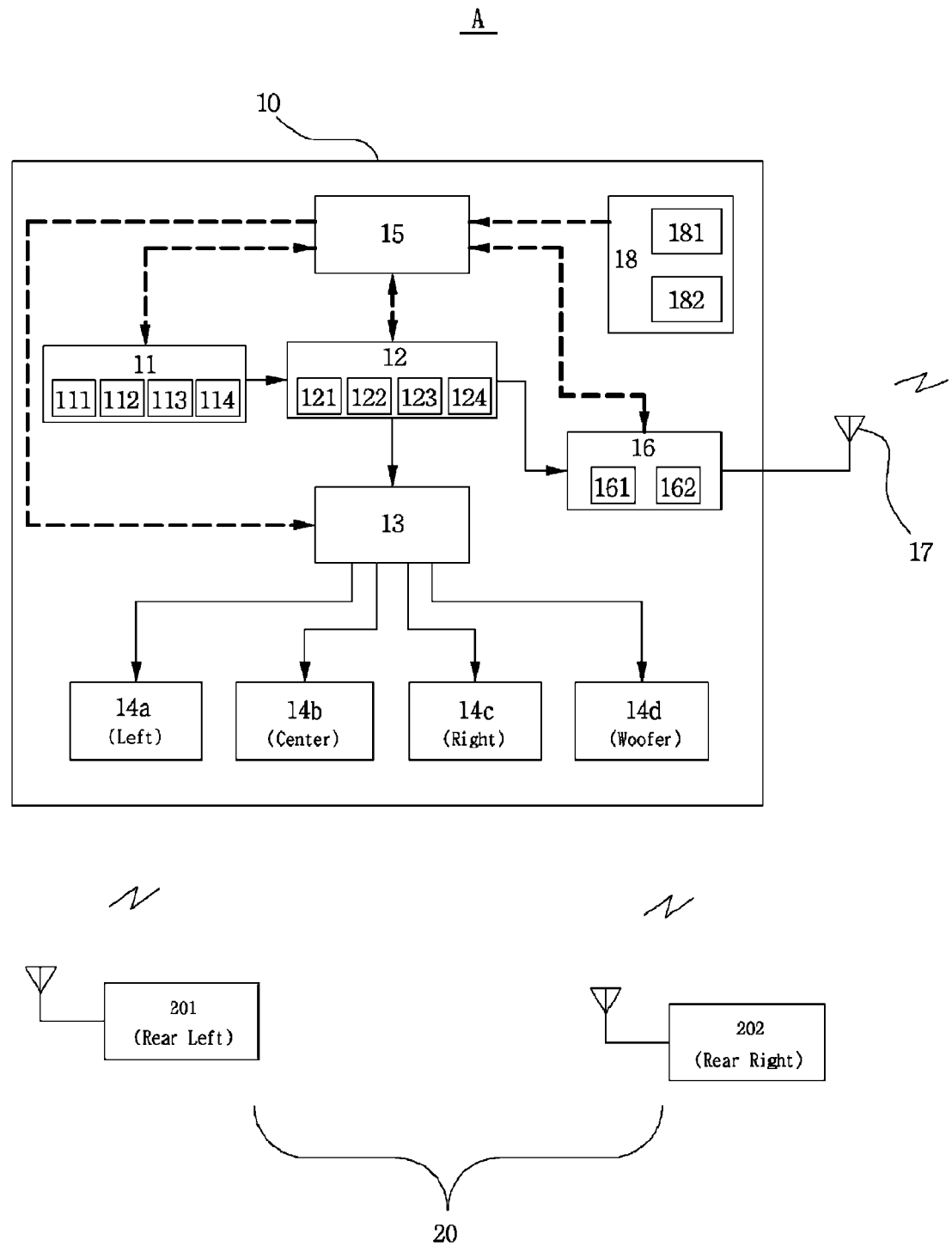
FIG. 2 is an organization chart of the host television of a bi-directional broadcasting system for a small space according to this invention.
Figure 3:
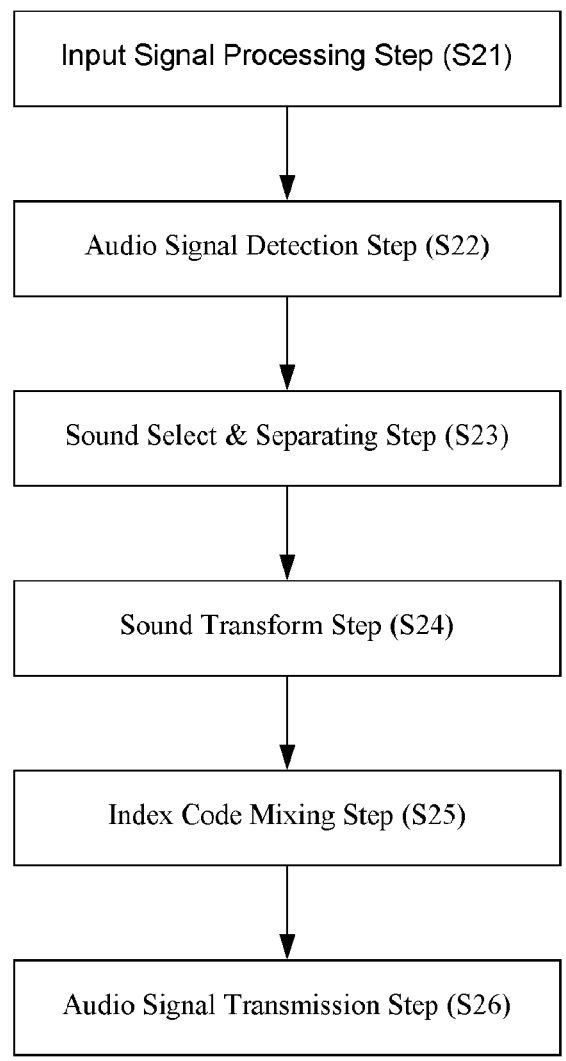
FIG. 3 is a control block diagram of audio-part in the host television of a bi-directional broadcasting system for a small space according to this invention.
Figure 4:
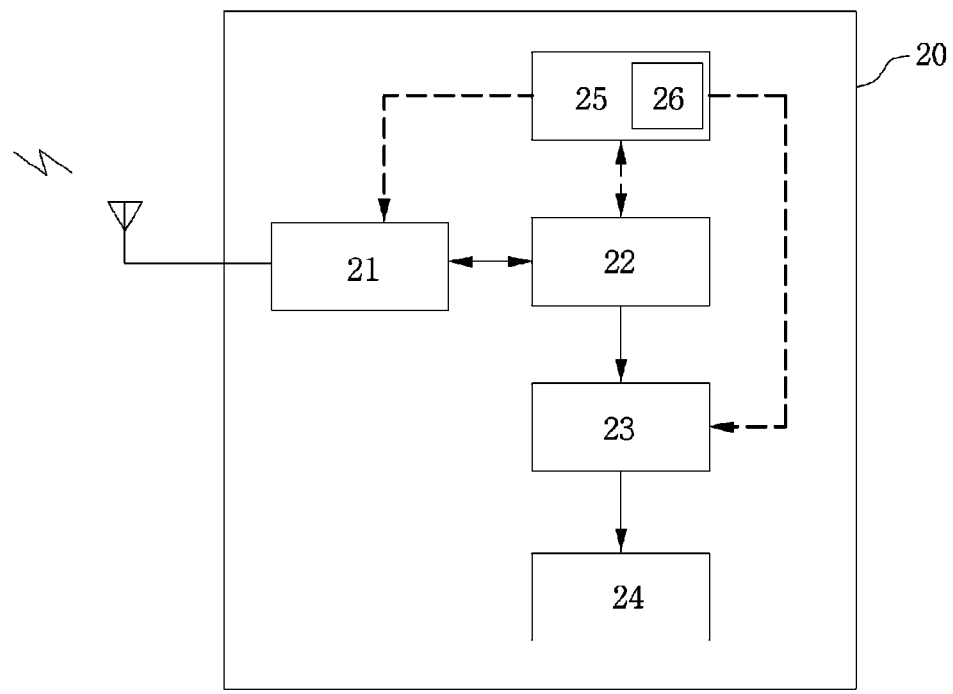
FIG. 4 is an organization chart of an external sound output system of a bi-directional broadcasting system for a small space according to this invention.
Figure 5:
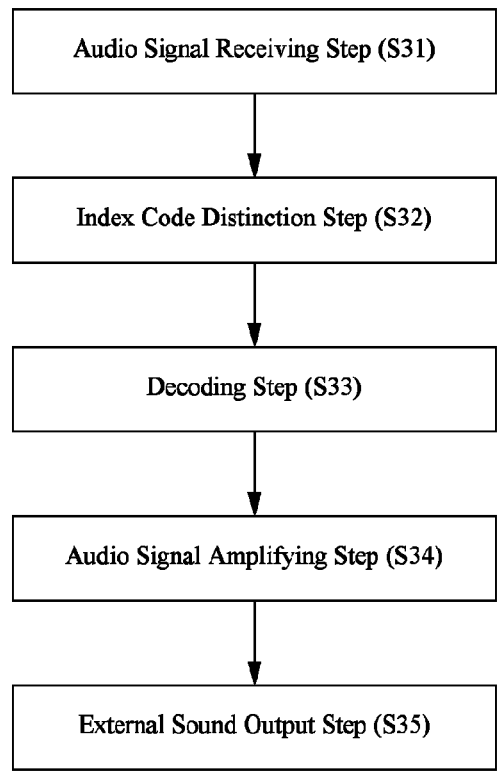
FIG. 5 is a block diagram of a control block for an external sound output system of a bi-directional broadcasting system for a small space according to this invention.

FIG. 1 is an organization chart of bi-directional broadcasting system for a small space according to the present invention. FIG. 2 is an organization chart of the host television of a bi-directional broadcasting system for a small space according to the present invention. FIG. 3 is a block diagram of the control block in the host television of a bi-directional broadcasting system for a small space according to the present invention. FIG. 4 is an organization chart of the external sound output system of a bi-directional broadcasting system for a small space according to the present invention. FIG. 5 is a block diagram of the control block for the external sound output system of a bi-directional broadcasting system for a small space according to the present invention.

Figure 9:
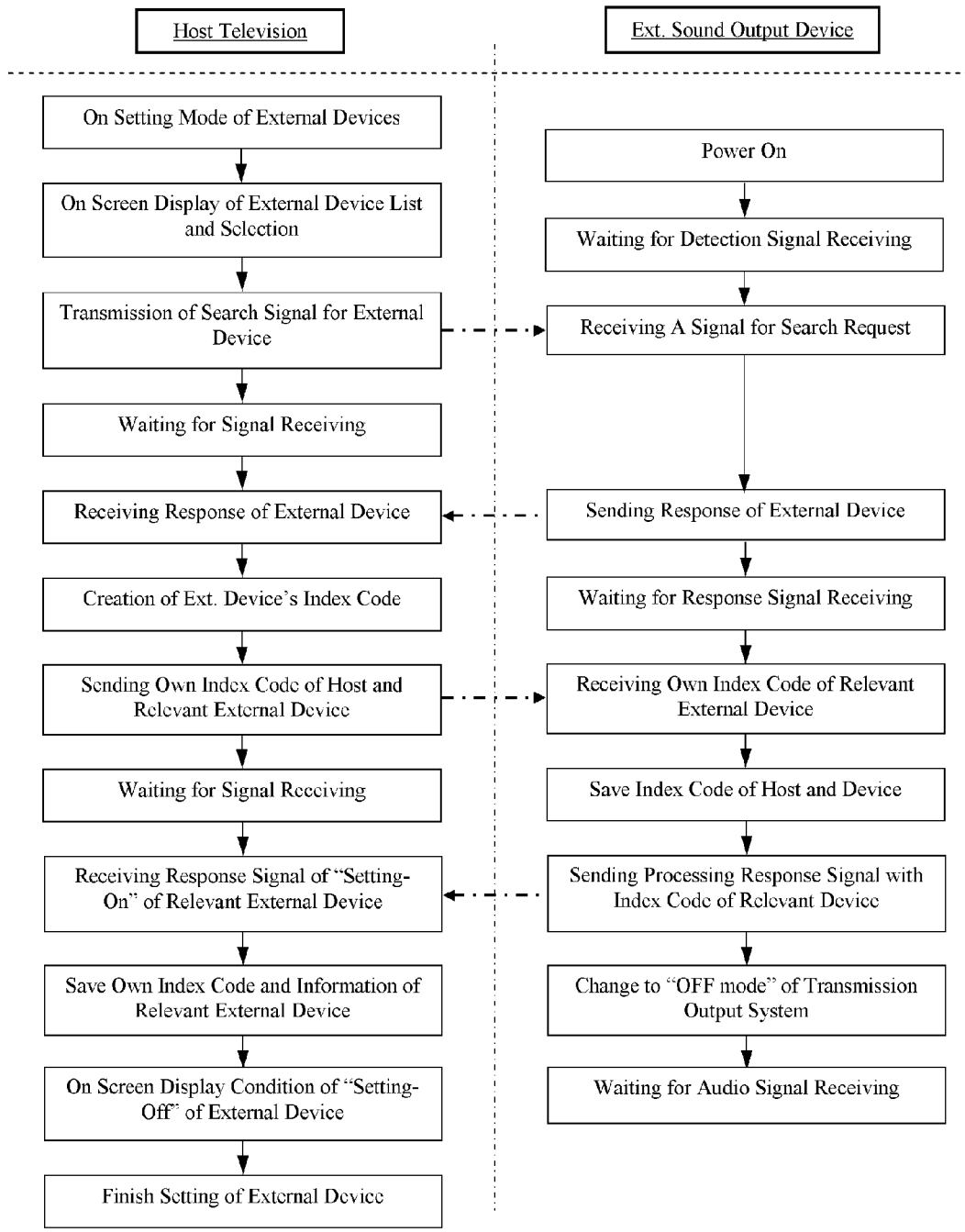
FIG. 9 is a flow chart of recognized code of the host television and output mode of a bi-directional broadcasting system for a small space according to this invention.

And FIG. 6 is an organization chart of the remote controller of a bi-directional broadcasting system for a small space according to the present invention. FIG. 7 is a block diagram of the control block for the remote controller of a bi-directional broadcasting system for a small space according to the present invention. FIG. 8 is an explanation table of external equipment set up of a bi-directional broadcasting system for a small space according to the present invention. FIG. 9 is a flow chart of an output mode of a bi-directional broadcasting system for a small space according to the present invention.

Figure 10:
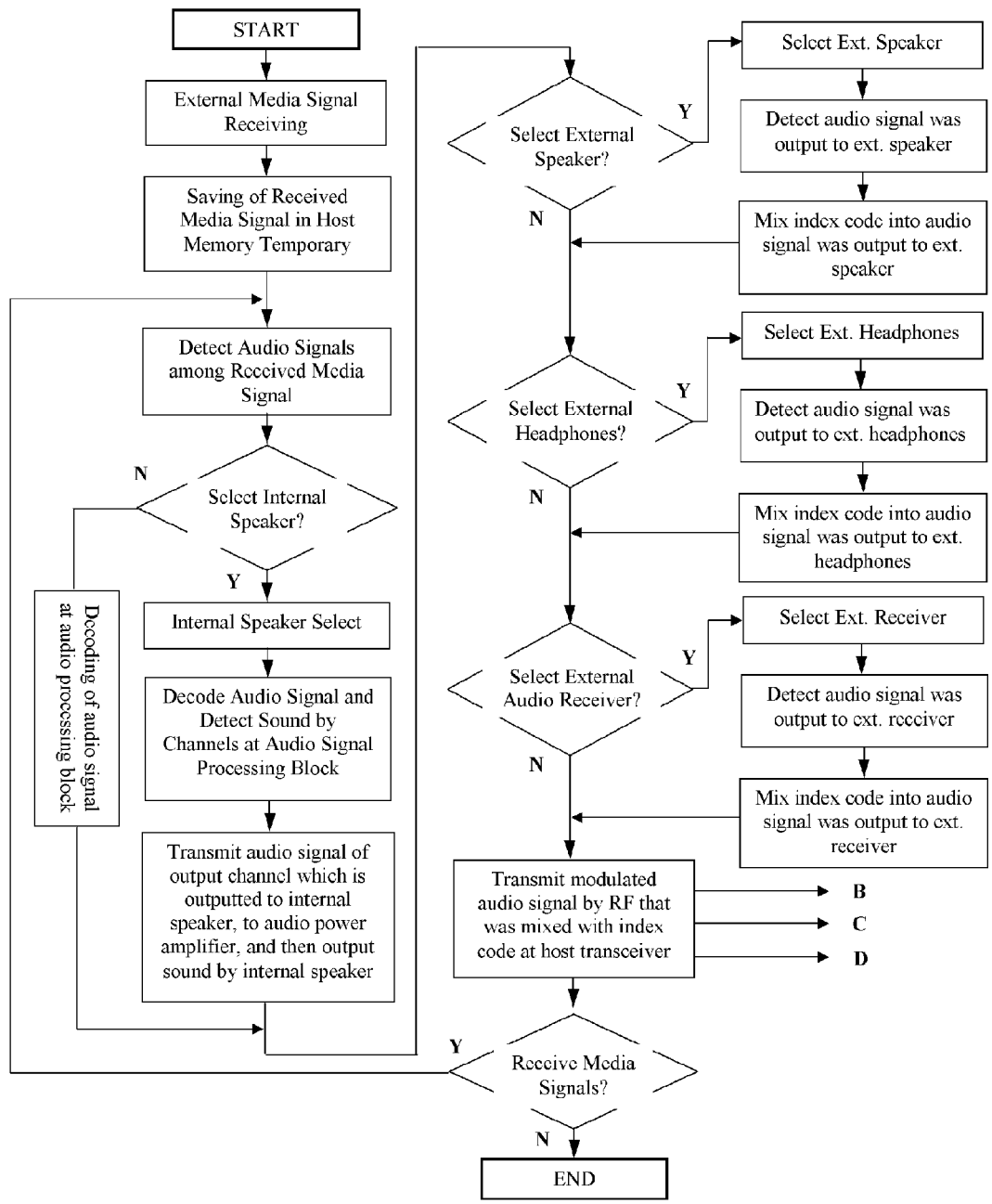
FIG. 10 is a flow chart of audio signal output of an example in the host television of a bi-directional broadcasting system for a small space according to this invention.
Figure 11:
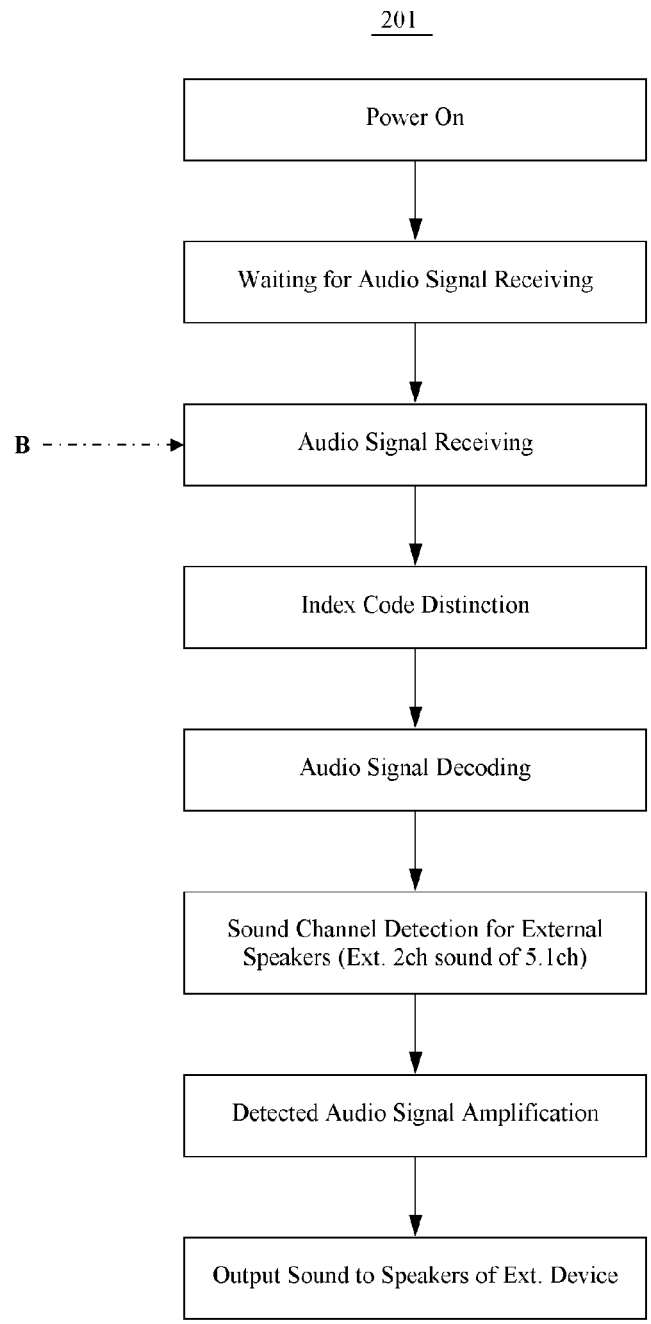
FIG. 11 is a flow chart of an audio signal processing of an example in the external speaker of external equipments of a bi-directional broadcasting system for a small space according to this invention.
Figure 12:
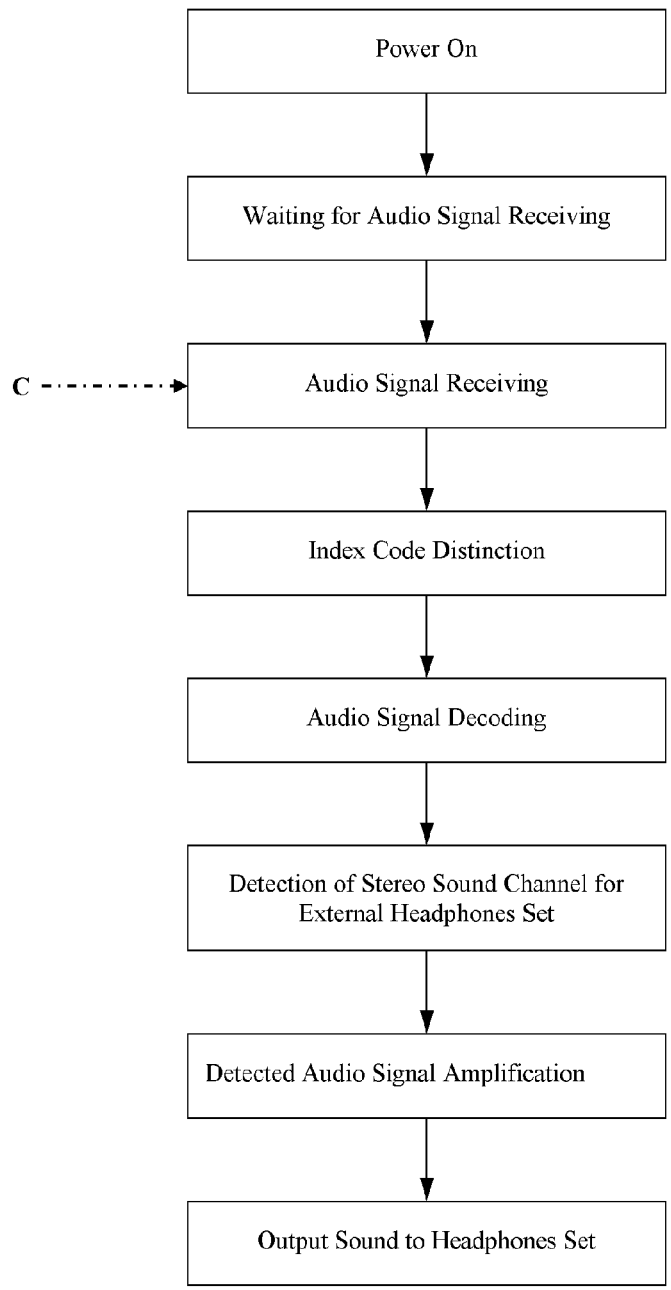
FIG. 12 is a flow chart of an audio signal processing of an example in the headset of external equipments of a bi-directional broadcasting system for a small space according to this invention.
Figure 13:
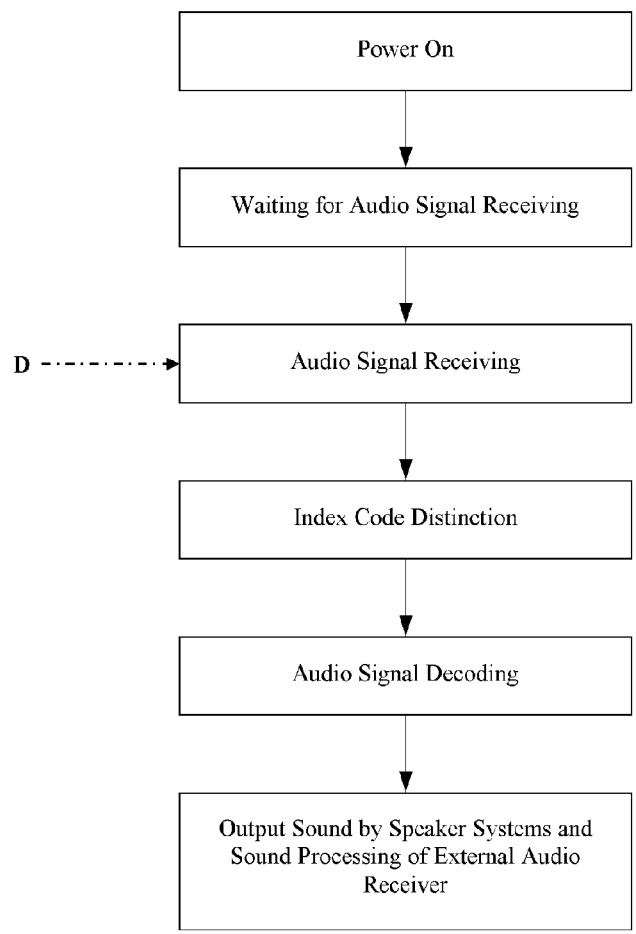
FIG. 13 is a flow chart of an audio signal processing of an example in the external audio receiver of external equipments of a bi-directional broadcasting system for a small space according to this invention.

From FIG. 10 to FIG. 13 represent flow charts of audio processing by an example of usages using a bi-directional broadcasting system for a small space; FIG. 10 is a flow chart of audio signal output of an example in the host television of a bi-directional broadcasting system for a small space. FIG. 11 is a flow chart of audio signal processing of an example in external speakers of external equipments of a bi-directional broadcasting system for a small space. FIG. 12 is a flow chart of audio signal processing of an example in the headset of external equipments of a bi-directional broadcasting system for a small space. FIG. 13 is a flow chart of audio signal processing of an example hi the external audio receiver of external equipments of a bi-directional broadcasting system for a small space. However, as for these cases, it can be realized different types by different usages of external devices that was set depend on external devices like an example of FIG. 8, an explanation table of external equipment set-up. As FIG. 9, it can be realized to output by multiple output modes. It is quite right that can be set differently depending on the setting condition of the host television and external devices by each output mode.

In detail, above this present invention as a bi-directional broadcasting system for a small space is consisted of; as mentioned above from FIG. 1 to FIG. 13, a host television (10) for receiving media signals from outside and outputting video and audio signal, and an external sound output system (20) for receiving audio signals from above host television (10) and outputting the sound. The method that the host television (10) receives media signals from outside is commonly known knowledge.

So to speak, sky wave of analog or digital television can be received media signals through indoor or outdoor television sending and receiving antenna. Also they can be received media signals by a coaxial cable which can be connected with wired or cable broadcasting station through wire, or an optical cable like the optical communication.

With application of this general media signal receiving technology, processing of video signal and display technology among media signals in the host television (10) can be used with general video signal processing and technology. However, this present invention as a bi-directional broadcasting system for a small space (A) applies different and important technology on processing of audio signal and technical architecture in the host television (10), detailed explanations are as below.

The host television (10) which is applied to the bi-directional broadcasting system for a small space is composed of an input signal processing block (11), an audio signal processing block (12) for detecting and processing audio signal of inputted media signal from above the input signal processing block (11) to detect the audio signal from media signal which is received from outside.

Also the host television (10) includes an audio sound processing power amp (13) which amplifies audio signals from above audio signal processing block (12), and an internal speaker (141) which outputs the sound by connecting with above audio signal processing power amp (13). These manages the host television (10) to have display which displays video media and internal speakers that output sound signals.

Furthermore it also includes a host control block (15) which controls above input signal processing block (11), above audio signal processing block (12), an audio signal processing power amp (13) and a host memory block (18).

The host control block (15) which controls the system of host television (10) controls processing of inputted outside signal to transform as media signal, distributing the media signal to video signal and audio signal, transforming video data to be possible to output by unexplained video processing block and controlling it to be displayed on television display. Moreover, by short article and control method as explained as below, to transform detected audio signal from media signal, it controls to output sound signals.

The host memory block (18) temporarily stores inputted input signal from outside, and stores temporary data which are processed in each step. Also, it stores control program which is applied to the host television (10), and data which is transformed according to the basic information of external equipments and sending and receiving data. Therefore, settled programs and information of external equipments for above explained external equipments are also stored with own index code for external equipments to be worked with a bi-directional broadcasting system for a small space and external equipments.

As an important configuration for the bi-directional broadcasting system for a small space, a host transceiver (16) which receives the audio signal from above audio signal processing block (12) in above host television (10) and transforms to RF signal is included. Above host transceiver (16) as data block, which transforms audio signal and control data by external equipments and outputs them, manages to output the own index code of the host television (10) with sending data in order for the signal to be distinguishably recognized by the signal from external equipments.

In addition to this sending data, it manages that own index code of above external equipments is individually sent in order to receive and process certain distinguished data which is from the just selected external equipment among multiple data sent from the host television (10).

To explain above better, first take a look at processing format of an audio signal. In audio signal processing block (12), an audio signal is processed by a decoding block (121) which decodes audio signals. Among decoded audio signals by connected with above decoding block (121), according to external equipment information stored in above memory block (18), an audio signal selection block (122) is included which selects an audio sound that will be sent to above external equipment by control of host control block (15). By this audio signal selection block (122), an audio signal is individually selected to be sent to external speakers (external left side speaker (201)), external right side speaker (202), headsets (headset 1 (203), headset 2 (204), headset 3 (205)), and an external audio receiver (206).

And also a down mixing block (123), which transforms the selected audio signal from above audio signal selection block (122) to down mixing, and an encoding block (124), which encodes by connected with above down mixing block (123) to wirelessly send audio signal, are compounded to create a basic audio signal to send.

Also above host transceiver (16) that was configured with a code mixing block (161) that mixes and transforms own index codes of the host television (10) and relevant external devices in the selected and transmitted audio signal from the audio signal processing block which was included above audio signal selection block (122). Also a signal transformer (162) to transform this encoded audio signal as RF signal to transmit is also included so that through sending and receiving antenna (17), the audio signal which is transformed as RF signal will be sent.

As in FIG. 1, the host transceiver (16) that was configured to receives and transforms the signal not only from the audio set up of external equipment but also from the remote controller to send it to the host control block (15).

Therefore, above external sound output system (20) that was configured to receive the sent audio signal from the host transceiver (16) of above host television (10) and output the sound through an external speaker (24).

So, above external sound output system (20), as FIG. 1 through FIG. 4, consists of; an external sending and receiving signal processing block (21) which receives the sent signal from host transceiver of the host television (10), an external audio signal processing block (22) which transforms the audio input signal from above external sending and receiving signal processing block (21), an external audio sound processing power amp (23) which amplifies outputted audio signal from above external audio signal processing block (22). Therefore, this external sound output system (20) processes the received audio signal and amplifies. This amplified audio signal will be output the sound by an external speaker (24) and headsets (203, etc) which are connected with above external audio sound processing power amp (23).

Also, the audio signal is processed by control of an external control block (25) which controls, above external sending and receiving signal processing block (21), above external audio signal processing block (22), and above external audio sound processing power amp (23). Along with above, external sound output system (20) is also formed with an external memory block (26) which temporarily stores received data and index code value.

Specially, above external control block (25) of above external sound output system (20) compares the index code value of received signal from the external sending and receiving signal processing block (21) with an external equipment index code and a host index code stored in the external memory block (26). If they are matched to be correct signal, it sends a control signal to above audio signal processing block (22) to process the audio signal.

In deed, above audio signal processing block (22) detects the selected audio signal by above external control block (25), and the selected audio signal will be outputted to sound by the external audio power amp (23) and the external speaker (24).

Like above, this present invention's broadcasting system control method, according to the basic system configuration of the bi-directional broadcasting system for a small space, is as below.

The bi-directional broadcasting system for a small space according to this present invention consists of two big categories; a host television (10) and an external sound output system (20). Therefore, it is controlled by one step that is for sending audio signal from the host television (10), and another step that is for outputting received audio signal as sound from the external sound output system (20).

First of all, take a look at the step where the host television (10) sends out the audio signal. The input signal processing block (11) of the host television (10) sends or signal processes the input signal from outside by wirelessly or with cable. This step is called an input signal processing step (S21). Above inputted signal included with the media signal from a broad casting station or a media sending company, was received not only the last analog media signal but also the recent digital media signal.

Then an audio signal detect step (S22) which detects the audio signal among inputted media signals which was sent from above input signal processing block (11) to the audio signal processing block (12) processed by above input signal processing step (S21), is executed. A special video display step was configured to display a video signal in media signals in the host television (10)'s display. Also with this display processing step, the audio signal processing step is executed also.

The sound select and separating step (S23) selectively detects the audio sound which was related information of an external equipment which stored in the host memory block (18) among the audio signal which was detected by above audio signal detect step (S22) is distributed and detected by host control block (15)'s control and by audio signal selection block (122) of above audio signal processing block (12), is executed.

The sound select and separating step (S23) possesses several cases according to selection; 1) a case where using the internal speaker (141) and external speakers (24) included in the host television (10), 2) a case where not using the internal speaker (141) and external speakers (24) but using external headsets (203, etc), 3) a case where not using internal speakers (141), external speakers (24), and external headsets (203, etc), but using an external audio receiver (206) from outside. As for example, case 2, not using internal speakers (141), external speakers (24), and external headsets (203, etc), it is controlled not to detect the received audio signal but just to output the sound as the way it is. Of course for the case where audio sound is selectively detected regardless of internal speaker's existence, according to speaker's existence, it can have the case where audio sound data for above sound out system, is outputted The sound transform step (S24) is for transforming the audio signal in the audio signal processing block (12) which is distributed and detected by above sound select and separating step (S23) in order to output to external equipments. The sound signal which is sent to external speakers and an external audio receiver is detected by 5.1 channels or multiple channels, and the sound signal which is sent to head sets, is down mixed and encoded in order to be detected as stereo sound.

The transformed audio signal by above sound transform step (S24) is sent to code mixing block (161) of the host transceiver. And the index code mixing step (S25) is executed which composes own index code of the host television (10) and external sound output systems (20) with transformed audio signals.

At this time, if it is multi channels to be sent to a mono external speaker, a mono external speaker index code will be composed. But if there are multi external speakers, and each of them becomes individual channel to send out the sound, each different own index code will be composed. Also for audio signals which are sent to multi channels, it can send the data information about distributing and detecting selected channel for each selected speaker. This sending signal is added on to audio signal, and selected external speaker's own index code to send the information about the detected channel. Therefore multiple set external speakers will send out each different sound for different speakers to provide surround sound.

As for headsets and an external audio receiver, if they are multiple, it is designed to send out an individual headset and an external audio receiver's individual own index code with audio signals. For a headset, it can include the audio signal of stereo sound with an own index code of the host television (10), but does not compose the own index code for the headset. Also for an external audio receiver, it does not have to include audio receiver's individually own index code; instead, it can include the own index code for the host television with audio signals to send as sending signals. Further, as for multi external speakers, if surround sound by sending out all same sound is not wanted, without own index code for an external speaker, the signal that includes audio signals and an own index code for the host television will be sent.

Above can be executed in a conference room where outputting same information from multiple headsets and speakers are wanted.

About the audio signal which is distributed and processed by composing, composed audio signal by above index code mixing step (S25) will be transformed as RF signal from a signal transformer (162) of the host transceiver (16) and send through the sending receiving antenna (17). This is an audio signal transmission step (S26) and it executes an audio signal transmission step of the host television (10).

Next step is for sound outputting of received audio signals at an external sound output system (20).

As of FIG. 5, the transmitted audio signal by sending and receiving antenna (17) of above host television (10) is received by an external sending and receiving signal processing block (21) of the external sound output system (20). This audio sound is signally processed in an audio signal receiving step (S31). For next, index code distinction step (S32), this checks the index code of received signal from the external sending and receiving signal processing block (21), is executed.

If recognized code matches by above index code distinction step (S32), decoding step (S33), which is decoding the received audio signal, and audio signal amplify step (S34), which sends transformed audio signal by above decoding step (S33) to external audio sound processing power amp (33) to amplify, are executed. After that external sound output step (S35), which outputs the amplified audio signal by audio signal amplifying step (S34) through external speakers (24), is executed so that the sound comes out from external speakers (24).

For an audio receiver, if the audio receiver is composed of amplifiers or stereo systems which are connected with speakers, the sound is heard. But if it is composed of a computer, a mobile system, or a recorder, it will process for the data.

Furthermore, this present invention, a bi-directional broadcasting system for a small space, as in FIG. 1, FIG. 6 and FIG. 7, can consist of a remote controller (30) which helps users to manage the host television (10).

This remote controller (30) is consisted of; a signal processing block for processing received signal from a key input block (31), a remote transmitter (33) for transforming and sending the signal from above signal processing block (32), a remote controller block (34) for controlling above signal processing block (32) and above remote transmitter (33).

Specially, the remote transmitter (33) of above remote controller (30) is managed to send out the recognized code with managed data signal from above key input block (31).

For this, the host control block (15) of above host television (10) checks whether the remote recognized code of received signal, which is sent from the host transceiver though the remote transmitter (33) of the remote controller (20), matches with a remote recognized code stored in host memory block (18). If the received remote recognized code value and a remote recognized code stored in above host memory block (18) match, the host control block (18) transforms received data signals and processes the data.

At this moment, the transmitting signal from the remote transmitter (33) of the remote controller (30) is a RF signal so the remote transmitter (33) will include more RF transform blocks.

If we see the movement of the remote controller (30), by the key input block (31) as FIG. 7, if user pushes the selected key, the data is outputted. (Key signal input step (S41)).

This key signal data is sent to the signal processing block (32) and there, it is transformed and processed as data which is wirelessly sent. (Signal conversion step ((S42).

To this data signal, a remote recognized code value about the remote controller is composed (Index code mixing step (S43)), and sent to the remote transmitter (33). This executes the key signal to be wirelessly sent (Key signal transmission step (S44)).

The sent signal as above is received and transformed through the host transceiver (16) of the host television (10) and sent to the host control block (15). Therefore, at the host control block (15), it checks if the recognized code of selected remote controller (30) is correct or not and if it is regular correct signal, the host control block (15) will distinguish the signal and processes the inputted key signal.

Especially, as part of the bi-directional broadcasting system for a small space according to this present invention, the transmitted signal which was sent through the host transceiver (16) of the host television (10), the transmitted signal which was outputted from each external sound output system (2), and the transmitted signal which was sent through the remote transmitter (33) of the remote controller (30) are all RF signals. Since they are a microwave signal such as 2.4 GHz, etc., they can send out clean audio signals in a small space like indoors.

Therefore, watching DVD, movie, or cable TV at home can bring the clean and surround sound since they are sent by a microwave signal such as 2.4 GHz, etc. Also for the meeting at a conference room, since the representative's voice can be heard concisely and clearly, it can create the effective meeting condition for both attendees and representatives.

Above was explanation for an individual formation and a concise control method of the bi-directional broadcasting system for a small space according to this present invention. Following will be further in detail.

External sound output systems (20) which are applied to this present invention, the bi-directional broadcasting system for a small space, can be formatted by various equipments. For example, external speakers (indication 201 and 202 in FIG. 1) that contain a woofer can be used.

These kinds of external speakers can have either one speaker system which outputs the full range sound or multiple speaker systems such as high, low, middle frequency sound speaker system. For the multiple speaker system, if the sound is low frequency sound, a woofer can be applied too.

Also, headsets (indication 203, 204, 205, etc in FIG. 1), which helps the sound to be outputted to both left and right stereo sound, can be part of the external sound output system (20). For above kind of headsets, the sound can be outputted as the audio sound from multi channeled sound system, for example 5.1 channels, in the host television (10). The head set will receive the audio signal which is outputted from multi channel, and it will go through down mixing step which will transform the sound to be stereo sound.

On the other side, the audio signal which will be sent to headsets, can be sent with own index code for headsets and this audio signal can be down mixed to become stereo sound. In other words, it was down mixed to stereo sound and transmitted by the audio signal selection block (122) of the host television (10), the headset outputs transformed stereo sound. Therefore, the headset will not be needed extra down mixing process, it was characterized by the configuration of the headset that can be simple.

And an audio receiver (indication 206 in FIG. 1) can be equipped by an audio system which can be consisted of a computer, a mobile system (including cellular phone), a recorder, a sound amplifier, and a stereo system. This audio receiver (206) distinguishes the peculiar recognized code from the transmitted signal by the host television (10). If it is a correct signal, the received audio signal will be transformed as data. The audio receiver itself can be a speaker. Therefore a user can hear the sound right away from it, or it can output the sound through other speakers by processing audio signal with the audio system. Furthermore, it was configured to be formatted to transform the received audio signal to digital signal by a computer, a mobile system, etc. and it was configured to be saved the received audio signal.

Internal configuration in the host television of the bi-directional broadcasting system for a small space according to the present invention is concisely explained below. As in FIG. 2, the input signal processing block (11) which processes the received media signal from outside is included, and the transmitted signal from the input signal processing block (11) will be processed and transformed by the audio signal processing block (12) by detecting the audio signal from media signals of input signals. Also, the detected audio signal will be sent to the audio sound processing power amplifier (13), amplified and outputted the sound through internal speakers.

Hence, the input signal processing block (11) also receives the external equipment index signal from external equipments. For detailed configuration of the input signal processing block (11), it consists of; a signal receiving conversion block (111) for receiving and converting the signal from outside, and a distinction block (112) for distinguishing transformed and received signals whether it is for external equipments and a remote controller signal or transmitted signals including media signals.

If the signal is distinguished to be a transmitted signal including media signals by the distinction block (112), the signal will be sent to the media signal processing block (114) and again to the audio signal processing block (12) to be signalized.

For another case where the signal is distinguished to be an external equipment and a remote controller signal in the distinction block (112), it will be sent to an equipment signal processing block (113) and analyzed for the data verifying, the peculiar recognized code for external equipments will be analyzed and compared with the data stored in the host memory block (18). If it is correct as the remote controller data, it will be sent to the host control block (15) and control the signal according to selected key signal. For the case of the peculiar recognized code of external equipments, it will be signalized suitably.

And the audio signal processing block (12), processing the media signal which was sent from the input signal processing block (11), consists of; a decoding block (121), an audio signal selection block (122), a down mixing block (123), and an encoding block (124).

Also the internal sound output signal from the audio signal selection block (122) will be amplified through the audio sound processing power amp (13) and sent to internal speakers to output the sound.

As for the configuration of internal speakers (14), FIG. 2 is suitable. The input speaker (14) of FIG. 2 consists of a left (14a) and a right side speaker (14c), a center speaker (14b) at the center, and a woofer speaker (14d) for outputting low sound. This internal speaker is formatted for nonexistence of external speakers. Since it has 2.1 channels, 3 channels or 3.1 channels, the music sound is heard by left and right stereo sound though a left speaker (14a) and a right speaker (14b), the singing and conversation is heard by a center speaker (14b), and low frequency sound is heard through a woofer speaker (14d) (sub-woofer speaker).

Furthermore, if the audio signal from the host transceiver (16) of the host television (10) is sent as 5.1 channel method, using a left speaker (201) and a right speaker (202) in outside to change the sound selectively according to each channel, it can be heard from front left, front center, front right, woofer speaker (14d), rear left, and rear right as 5.1 channel.

If we eliminate or limit the center speaker (14*b*) in the center and a woofer speaker (14*d*) from internal speakers, the sound can be heard from front left, front right, rear left, and rear right as 4 channel. Furthermore, for the case where extra multiple internal speakers or multiple external speakers are installed in multiple locations and directions, the sound can be created as great surround sound by 6.1 channels or 7.1 channels.

Since this present invention, the bi-directional broadcasting system for a small space (A), has no limitation on wiring, if the formation of sound is distribution from the host television (10) to each channel, and detect and output each channel sound by each external speaker, it can embody more delicate and spacious sound system and it can be characterized to be heard as more natural sound.

And since it can be often changed the setting of external devices, it'll be cleared all problems of wiring about devices installation, repair, etc as present wired system, so that it will bring satisfactory indoor and outdoor interior because it can be easily changed the installation of sound system.

Furthermore, instead of dividing external speakers, headsets and an audio receiver, just formats diverse channels like stereo, 5.1-channel, 7.1-channel and etc., and operates only necessary channels, it can be showed the merit that can apply for a wide lecture room, a big meeting room, and a big conference room, etc., just by one system, only the speaker located at desired place can be turned on.

Examples of Setting External Equipments

As of this present invention, bi-directional broadcasting system for a small space (A), the configuration of external equipments can be diversely set and installed.

Below shows a basic setup of an external equipment.

FIG. 8 is an example of set up of external equipments. However, this figure only represents as one of examples and it's not limited that can be other setup. Any technology that can be drawn out from this basic formation of external equipments, that technology is absolutely related to this present invention.

To see the process of steps, first of all, the user sets the mode of external equipments in the host television (10). As in FIG. 1, a user controls the center control button (142) of the host television (10) or the key input block (31) of the remote controller (30) to be set up mode of external equipments, and selects the additional menu about distributed situation of external devices or setup of external equipment on screen display of the host television (10).

When an external equipment is set, according to set up mode, the host television (10) sends out the audio signal, which is selected by chosen mode from the broad casting system (A)'s mode set up. The audio signal, without any communication with a receiver, will be broadcasted with given recognized signal by a microwave signal like 2.4 GHz, etc. Before that, since the power of the external sound output system (20) is on, which means the set up between the host television (10) as receiving only, without any special control or set up on equipment, it is ready to receive the audio signal according to the programmed step. Therefore, multiple external sound output systems (20) check the recognized code of data signal from the host television (10) to compare the external equipment recognized code value stored in above external memory block (26) and recognized code value of received signal. If they match, it sends out control signal to the audio signal processing block (22) to process the audio signal.

Above audio signal processing block (222) detects the audio signal by above external control block (25), and detected audio signal will be outputted through external audio sound processing power amps (23), external speakers (24) and etc.

As for another example, it can be configured when an external equipment and mode is set, the host television sends out a microwave signal like 2.4 GHz, etc. to search external equipments and waits for the reply signal.

Before that, the external sound output system (20) is not connected with powered host television (10), it is in stand by mode for the receiving control order of equipment set up. During the stand by mode, if it receives a searching request signal of external equipment, it sends out a reply signal about external equipment. At this time, the external sound output system (20) adds temporary recognized code with the reply signal to show the match with the accord of recognized code of re-reply signal from the host television (10).

When the host television (10) receives the reply signal from external equipment, it produces the peculiar recognized code for this external equipment. With the temporary recognized code from the external sound output system (20), it sends out newly produced the peculiar recognized code for this external equipment and a peculiar recognized code of the host television and waits for the reply. For this step, the external sound output system (20) will check the temporary recognized code of received data signal from the host television (20). If it is correct, it stores both peculiar recognized codes of the host television (10) and the newly produced peculiar recognized code of the external sound output system (20) about the external equipment to the external memory block (26).

After above step, all the received data will be compared with shared recognized code value of the host television (10) and peculiar recognized code value of the external sound output system (20) of this external equipment. If it is judged to be the signal from this external equipment, it will process the data.

Since the external sound output system (20) does not have a receiving flow, unless the host television (10) sets the basic control for the external equipment again, the external sound output system (20) will change receiving output system to "Off" to decrease the power usage of the external sound output system (20). After this step, the audio signal will be received so that it changes its mode to receive stand by mode.

The external sound output system (20) will send out an answer signal to show that the peculiar recognized code for the host television (10) and the external sound output system (20) is well processed and finished. The host television (10), which receives this answering signal as the basic set up is completed for this external equipment, sends out the set up completion message on a display in order for user to see. Before that the host television (10) stores the created peculiar recognized code for this external equipment in the host memory block (18).

Therefore, the host television (10) will complete the set up for this external equipment, and after that for other external equipment's set up, it can process the search step and set up step for the external equipment. Further more, when the set up step for these external equipments is completed, it gets ready for outputting sound by switching itself to sending mode of audio signals.

Above example was for basic set up step of external equipments so the peculiar recognized code value of external equipments was produced from the host television (10). But the peculiar recognized code can be set up and stored in the external memory block (26) of the external sound output system (20) first and from the host television, as of answer for external equipment's search, it can be set to send out both answering signal of this external sound output system (20) and the peculiar recognized code value of external equipments.

Also for the case of remote controller (30), since it needs to send continuously key signals from the key input to the host television (10), the transmission output system will not be off but stand by mode. Also it does not apply the receiving mode of audio.

Examples for Application of External Equipments

FIG. 9 shows types of external equipments and examples of modes for this present invention, the bi-directional broadcasting system for a small space (A).

For types of the external sound output system, external speakers, external headsets, an external audio receiver were included in above examples. Of course, this invention is not limited to only above external equipments, many other variety equipments can be applied to this invention. For the basic example, as in FIG. 2, the internal speaker (14) consists of an internal left side (14*a*), an internal center (14*b*), an internal right side (14*c*), a woofer speaker (14*d*) and etc. The external speaker consists of an external left side (201), an external right side (202) and etc. as 5.1 channels.

From the set up mode examples in FIG. 9, mode 1 only consists of external speakers which can decode, without any internal speaker, any external headset, any external audio receiver and etc. The host television (10) outputs the audio signal with 5.1 channels, and a left side speaker and a right side speaker of external speakers detect the each chosen sound channel to send out the sound signal. In this case, user can enjoy 5.1 channels of surround sound just by a host television (10) and 6 or more speakers without an external audio receiver.

Since mode 2 only contains internal speakers without other external speakers, the audio signal of internal 2.1 channels is outputted from internal speakers, in addition to left and right side of stereo sound, the center woofer speaker sound also can be heard.

In mode 3, internal speakers and external speakers are formed. The audio signal of 3.1 channels is outputted through internal speakers and for external ones, the audio signal of 5.1 channels for external speakers will be outputted. Therefore left and right speaker of external speakers output the sound of each required channel so that surround sound of 5.1 channel can be heard by front sound signal of internal speakers and back sound signal of external speakers.

In mode 4, any internal speaker and external speaker is not selected but headsets (203, etc) so that the audio signal of stereo sound for headset (203, etc) is outputted. Therefore multiple head sets can be used to hear the stereo sound without any limitation on movement.

In mode 5, only internal speakers are selected and not the external speaker. By the host television (10), user can hear the same 2.1 channel sound as headsets while using the headsets at the same time; the audio signal of stereo sound is outputted for down-mixed headsets. Therefore by the host television (10), down-mixed sound by 2 channels or 2.1 channels can be heard and while moving around with headsets, stereo sound can be heard.

Furthermore, in mode 6, only an external audio receiver is formed so that multi channel of 5.1 channels and audio signal of stereo sound will be outputted to the outside. For the 5.1 channels which are outputted to the outside, the external audio receiver receives the audio signal such as 5.1 channels, and processes the data. In this case, a special external audio receiver is used to hear surround sound of 2 channels, 5.1 channels and 7.1 channels.

Like above, as for external equipments, variety of modes can be set and according to these modes, the bi-directional broadcasting system for a small space according to this present invention can be changed properly to provide surround and stereo sound.

For indoor interior change, new set up for external equipments, or sitting assignment in a conference room, just by executing basic set up of external equipments for each case, several types of external equipments can be applied. Therefore set up is really easily changeable.

Examples for Application of the External Sound Output System (20)

From FIG. 10 to FIG. 13, examples, which applied internal speakers and the external sound output system (20) about application of external equipments, is shown.

FIG. 10 is a flow chart for control flow of the host television (10). It shows an example of flow chart that shows among internal speakers, external speakers, external headsets and an external audio receiver as in FIG. 8, according to with mode selection and the feasibility of set up for the external audio, the audio signal is processed and outputted. FIG. 11 is the flow chart for control method of external speakers which processes the audio signal received from control flow of the host television (10). FIG. 12 is the flow chart for control method of external headsets which processes the received audio signal that is outputted according to control flow of the host television (10). FIG. 13 shows the flow chart of control method of an external audio receiver which processes the audio signal (D part of FIG. 10 and data sending) that is outputted by control flow of the host television (10).

While the external sound output system (20), which is external equipment, is set as basic set up method of external equipments as in FIG. 8, the audio signal is outputted by checking the adoption of same external sound equipment as in FIG. 9. Above explanation is an example of this present invention, the bi-directional broadcasting system for a small space formatted as FIG. 1 through FIG. 7.

First of all, since external equipment is set before sending out the audio signal as a microwave signal, settled information of an external equipment and peculiar recognized code of selected external equipment are already stored in the host memory block (18).

Therefore, from the outside, the input signal which includes media signals is received into the host television (10) from the outside, The received input signal is temporarily stored in the host memory block (18). This host memory block (18) consists of an equipment information memory block (181), which stores selected external equipment's information and peculiar recognized code of external equipment, and the media memory block (182), which stores the media signal from outside, the media signal that is processed by the host control block (15), and audio signal.

Therefore it stores the received input signal and media information at the media memory block (182) of the host memory block (18), and also stores detected audio signal from the media signal.

According to the selection of mode, if the internal speaker is selected, the audio signal is decoded. After that, the channel of sound signal from internal speakers is detected and sent to audio sound processing power amp so that sound will be outputted through internal speakers.

However, for the case where input signal is not selected, the received audio signal is not processed and just goes on to next step.

Therefore, as of next step, it checks whether external speaker is selected or not. If the external speaker is detected, it detects the audio signal, which will be outputted to the external signal, sends to the host transceiver (16) and the code compose block (161) of the host transceiver (16) will compose the peculiar recognized code on top of audio signal, that will be outputted to external speakers.

Also, from all mode set up, it checks if an outside head set is selected or not. If selected, then detects the audio signal of stereo sound, which is down mixed to send out to external head sets, sends to the host transceiver (16) and composes selected peculiar recognized code though external head sets in the code compose block (161).

If the selection of the external audio receiver is checked, the audio signal which will be outputted to the external audio receiver, is detected and composed with peculiar recognized code in the code compose block (161).

Therefore, the selection of an external equipment is detected and selected peculiar recognized code is composed, the composed audio signal will be transformed to a microwave signal and outputted.

Above example is a formation for about one received audio signal, which of internal speakers, external speakers, external head sets and an external audio is selected.

But before the step of sending audio signal, if it becomes receiving only according to the set up equipment information stored in basic set up step of the external equipment or the program is set to distinguish with the same modes as in FIG. 9, sending audio signal step can be set to not check or process the unselected external equipment. After detecting the audio signal from the media signal, according to external equipment's set up mode, it is set as only selected control processing step of selected external equipment can be processed. So, the unnecessary control processing step will be removed and an efficient bi-directional broadcasting system for a small space is formed.

Therefore, each audio signal from the host television (10) will be individually received and processed at selected external equipment.

For the external speaker's case, as in FIG. 11, while in stand by mode, if it receives an audio signal, among received sending data, recognized code for the host television and selected external speaker is detected. If they are correct, the audio signal is decoded. Specially, it is formed based on the case where in basic set up step of external speakers, whether the selected external speaker is mono, right or left is already set. The correct sound for the channel of selected external speaker will be detected from the received audio signal. Since the audio signal from the host television (10) will be sent based on 5.1 channels, decoded audio signal, which is from the external speaker is one channel among 5.1 channels. Among this, the left external speaker detects the sound through only left speaker (surround speaker), and the right external speaker detects the sound from right speaker (surround speaker) of 5.1 channels of audio signals.

Since detected audio signal is amplified so that a user can hear the output from the external speaker.

Also, for the case of external headsets as in FIG. 12, during audio stand by state, if the audio signal is received, the peculiar recognized code for the host television and selected external headset will be checked. If the recognized code is correct, it decodes the received signal.

Therefore in the host television, the signal, which will be outputted through head sets, is sent out as down-mixed stereo sound. So the external headset detects the stereo sound from the decoded audio signal and amplifies to output the sound through headsets.

Furthermore, in case of the external audio receiver, as in FIG. 13, it receives the audio signal while it's in stand by mode for the audio signal. After that it checks the peculiar recognized code for the host television and selected an audio, if it is correct, the audio signal is decoded. For the external audio receiver's case, when there is an extra speaker connected, the sound for extra speaker is detected and outputted.

Examples for Application of an External Signal Input System (40)

As for another example, the host transceiver (16) is configured in the host television (10) of the bi-directional broadcasting system for a small space (A). As FIG. 2, it can be configured that the host transceiver (16) receives and processes the media signal from an external signal input system (40) as adding receiving from the transmitting and receiving antenna of a television. For example, it receives the media signal from the host transceiver (16) by wirelessly through the external signal input system (40), and this media signal is transmitted to the input signal processing block (11), and processes the media signal and audio signal by the signal processing method as explained as above. Therefore, it detects and processes the audio signal among the media signal which is inputted to the audio signal processing block (12) from input signal processing block (11) after processing. After that, the audio signal processing method and configuration can be realized by same as above other examples. If the received media signal includes the video signal, the video signal will be processed same as above method.

For this example, it was configured to receive the media signal from the external signal input system (40) through the host transceiver (16) of the broadcasting system (A).

As this example, in case of receiving the media signal by the wireless method, the external signal input system (40) is set in a small space. This external signal input system (40) is also configured to receive the media signal from wired broadcasting or a video player, a DVD player and a camcorder, etc. And this external signal input system (40) can be configured with including a camcorder, an audio player, a mobile system, a portable device, or a computer device, etc.

As above, of course, it was explained this present invention to refer diverse examples, but it can embody other applications in this invention by many other variety ideas through modifying and changing within the area and concept of this invention as described in the claims of this invention as below, by a person who has the ordinary knowledge and experience on the technical field related to this invention.

The invention claimed is:
1. A bi-directional broadcasting system configured to be used in a small space comprising a host television (10) outputting audio/video media signals and an internal sound output system (13, 141) and/or an external sound output system (20) generating multi-channel sound using an audio signal received from the host television (10), wherein the host television (10) comprises:
an input signal processing block (11) which processes an input signal,
an audio signal processing block (12) which processes an audio signal detected from a signal input from the input signal processing block (11),
an audio power amplifier block (13) which amplifies an audio signal output from the audio signal processing block (12),
internal speakers (14a-14d) which generate multi-channel sound in connection with the audio power amplifier block (13),
an host control block (15) which controls the input signal processing block (11), the audio signal processing block (12), and the audio power amplifier block(13),
a host memory block (18), and an embedded host transceiver (16) which is configured to control bi-directional communication between the host television (10) and external devices, receive an audio signal from the audio signal processing block (12) and convert the audio signal into an RF signal;

wherein the audio signal processing block (12) comprises:

a decoding block (121) configured to decode an encoded audio signal from the input signal processing block (11), an audio signal selection block (122) configured to extract desired audio channels according to internal and/or external audio system information stored in the host memory block (18), a down mixing block (123) configured to transform a multi channel audio signal extracted by the audio signal selection block (122) to a down-mixed signal if down mixed sound is requested by the internal and external audio system, and an encoding block (124) which is connected with the down mixing block (123) to encode the down-mixed signal from the down mixing block (123) to transmit a resulting audio signal wirelessly;

wherein the embedded host transceiver (16) comprises:

a code merging block (161) which compounds a recognition code into the encoded audio and/or video signal for RF modulation, the recognition code being a unique identification code of the host television (10) which is used in bi-directional communication between the host television (10) and external devices for preventing cross talk and wiretapping, and a RF signal converter block (162) which modulates the compounded audio and/or video signal into a RF signal for wireless RF transmitting;

wherein the internal sound output system (13, 14*a*-14*d*) is configured to output a multi-channel sound which is 2.1 channel or 3.1 channel sound using the audio signal output from the down mixing block (123); and wherein the external sound output system (20) is configured to output a multi-channel sound signal using the audio signal output from the host transceiver (16) which transmits an audio signal extracted by the audio signal selection block (122) of the host television (10).

2. The bi-directional broadcasting system of claim 1, wherein the external sound output system (20) further comprises:

an external transmitting and receiving signal processing block (21) which receives a signal from the host transceiver (16) of the host television (10), an external audio signal processing block (22) which transforms an input signal from the external transmitting and receiving signal processing block (21), an external audio power amplifier block (23) which amplifies an audio signal from the external audio signal processing block (22), an external speaker (24) which outputs audio sound by operatively connecting to the external audio power amplifier block (23), an external control block (25) which controls the external transmitting and receiving signal processing block (21), the external audio signal processing block (22), and the external audio power amplifier block (23), and an external memory block (26), wherein the external control block (25) compares a recognition code of received signal from the external transmitting and receiving signal processing block (21) with an external system recognition code/host recognition code which is stored in the external memory block (26), and the external control block (25) sends a control signal to the external audio signal processing block (22) to extract a desired audio signal from the external audio signal processing block (22) if the recognition code and the external system recognition code/host recognition code matches.

3. The bi-directional broadcasting system of claim 1, further comprising a remote controller (30) which includes a signal processing block (32) for processing a signal from a key input block (31), a remote transmitter block (33) for transforming and transmitting the signal from the signal processing block (32), a remote control block (34) for managing the signal processing block (32) and the remote transmission block (33), wherein the remote transmitter block (33) transforms and transmits a processed signal from the signal processing block (32) using a signal from the key input block (31) and a remote recognition code signal, and wherein the host control block (15) in the host television (10) determines whether a remote recognition code from the host memory block (18) matches with the remote recognition code transmitted from the remote transmitter block (33) of the remote controller (30) through the host transceiver (16), and transforms and/or processes received signals if the remote recognition code matches correctly with the transmitted recognition code.

4. The bi-directional broadcasting system of claim 1, wherein the audio signal selection block (122) of the audio signal processing block (12) is configured to create a down-mixed audio signal of 2.1 channels or 3.1 channels with the down mixing block (123) for the internal speakers, or create a stereo audio signal with the down mixing block (123) for wireless headphones sets, or reproduce a surround sound signal of 5.1 channels or 7.1 channels for the internal speakers and external speakers, and wherein the code merging block (161) of the host transceiver (16) is configured, if the external sound output system (20) includes one or mom headphone sets, to merge an external system recognition code/host recognition code for the headphone set into a stereo sound signal, or is configured, if the external sound output system (20) comprise internal speakers and external speakers, to merge an external system recognition code/host recognition code for the internal speakers and external speakers into a sound signal of any one of mono-channel and 7.1 channels.

5. The bi-directional broadcasting system of claim 1, wherein the host television (10) is configured to receive a media signal from an external signal input system (40) through the host transceiver (16) of the host television (10) by wireless communication, wherein the input signal processing block (11) sends the input signal from the host transceiver (16) to the audio signal processing block (12) after a media signal extraction, wherein the audio signal processing block (12) processes the extracted audio signal from the received media signal, and wherein the host television (10) is configured to transmit a recognition code merged media signal to an external sound output system (20) and/or an external signal input system (40) through the host transceiver (16) of the host television (10) by wireless communication.

6. The bi-directional broadcasting system of claim 1, further comprising a remote controller (30) which transmits a recognition code merged signal to the host transceiver (16), and an external signal input system (40) which transmits audio/video signals to the host transceiver (16), wherein the host television (10) processes and transforms the input signal by using the input signal processing block (11) and the audio signal processing block (12) and wirelessly transmits a transformed signal under control of the host control block (15) of the host television (10), wherein the external sound output system (20) is operatively connected to one or more of headphone sets (203), external speaker systems (201), audio/video receivers (206) which receive the audio signal from the host transceiver (16) of the host television(10), and wherein the internal sound output system (13, 141) is configured to output a multi-channel sound which is 2.1 channel or 3.1 channel sound using the audio signal output from the down mixing block (123), or configured to output 5.1 channels or 7.1 channels with the external speaker systems (201).

7. A control method of a host television (10) of a bi-directional broadcasting system, the control method comprising the steps of:

a search signal transmitting step for transmitting, by the host television (10), a search signal for an external device, the search signal including a recognition code of the host television (10) which is a unique identification code of the host television (10) for bi-directional communication between the host television (10) and external devices for preventing cross talk and wiretapping;

a recognition code setting step for setting a recognition code by receiving the search signal and transmitting a reply signal to the search signal by an external sound output system (20), assigning a recognition code to the external sound output system (20) by the host television (10), storing data on the recognition code of the external sound output system (20) in an equipment information memory block (181) of a host memory block (18) of the host television (10), and storing data on the recognition code of the host television (10) and the recognition code of the external sound output system (20) in an external memory block (26) of the external sound output system (20), the recognition code being a unique identification code of each of the host television (10) and the external sound output system (20) in bi-directional communication therebetween for preventing cross talk and wiretapping;

an audio output stand-by step for preparing, by the host television (10), for outputting an audio signal to the external sound output system (20) while the external sound output system (20) is waiting for the audio signal to be received;

an input signal processing step (S21) for receiving and processing an input signal from an external source through a cable or a wireless communication method by using an input signal processing block (11) of the host television (10);

an audio signal extraction step (S22) for extracting an audio signal from a media signal of the input signal which is sent from the input signal processing block (11) to an audio signal processing block (12);

a sound selection/separation step (S23) for extracting desired audio signal from among audio signals selected by an audio signal selection block (122) of the audio signal processing block (12) according to external device information stored in the host memory block (18), wherein a host control block (15) controls to separate and extract the extracted audio signal from the audio signal extraction step (S22);

a sound transformation step (S24) for transforming, by the audio signal processing block (12), the extracted audio signal from the sound selection/separation step (S23) to a transformed audio signal which will be outputted to one or more external devices;

a recognition code merging step (S25) for merging the recognition code into the transformed audio signal from the sound transformation step (S24), wherein the merged audio signal is from a code merging block (161) of an embedded host transceiver (16) is output to a signal transforming block (162);

an audio signal transmission step (S26) for transmitting a modulated RF signal by a signal transforming block (162) of the embedded host transceiver (16) through a transmitting-receiving antenna (17), wherein the merged audio signal is modulated by the signal transforming block (162) into the modulated RF signal;

an audio signal receiving step (S31) for receiving and processing the modulated RF signal transmitted from the transmitting-receiving antenna (17) of the host television (10), wherein the modulated RF signal is received by an external transmitting and receiving signal processing block (21) of the external sound output system (20);

a recognition code distinction step (S32) for distinguishing a match of a recognition code within a received signal from the external transmitting and receiving signal processing block (21);

a decoding step (S33) for decoding, demodulating, and/or transforming the modulated RF signal received by the external transmitting and receiving signal processing block (21) during the recognition code distinction step (S32), if the recognition code matches with a stored recognition code;

an audio signal amplification step (S34) for sending the transformed audio signal from the decoding step (S33) to an external audio power amplifier block (23) and amplifying the transformed audio signal by the external audio power amplifier block (23); and an external sound output step (S35) for outputting amplified sound from the audio signal amplification step (S34) using the external speaker (24).

8. A bi-directional broadcasting system configured to be used in a small space, comprising:

an external local media terminal configured to wirelessly receive and/or transmit audio/video signals each having a merged recognition code;

a host television configured to receive the audio/video signals from the external local media terminal, process the audio/video signals, and output the processed audio/video signals;

a plurality of external sound output terminals configured to generate sound using an audio signal received from the host television; and a remote controller configured to process a signal from a key input panel and transform and transmit the signal, wherein the host television comprises an embedded host transceiver which is configured to control bi-directional communications between the host television and external devices, wirelessly receive and/or transmit audio/video signals, and convert the audio/video signals into RF signals, and wherein the host television is configured to transmit a recognition code thereof to the external local media terminal, each of the external sound output terminals, and/or the remote controller and receive a recognition code of the external local media terminal, each of the external sound output terminals, or the remote controller when communication is commenced therebetween, the recognition code being a unique identification code for each of the host television, the external local media terminal, the external sound output terminals, and the remote controller in bi-directional communication therebetween for preventing cross talk and wiretapping.

9. The bi-directional broadcasting system of claim 8, wherein the external local media terminal is a mobile phone terminal.

* * * * *